United States Patent
Duan et al.

(10) Patent No.: US 8,902,609 B2
(45) Date of Patent: *Dec. 2, 2014

(54) CHIP CARD HOLDING MECHANISM AND ELECTRONIC DEVICE USING THE SAME

(75) Inventors: Ju-Ping Duan, Shenzhen (CN); Ming-Fu Luo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 220 days.

This patent is subject to a terminal disclaimer.

(21) Appl. No.: 13/427,921

(22) Filed: Mar. 23, 2012

(65) Prior Publication Data

US 2013/0140204 A1 Jun. 6, 2013

(30) Foreign Application Priority Data

Dec. 3, 2011 (CN) .......................... 2011 1 0395489

(51) Int. Cl.
*H05K 7/02* (2006.01)
*H05K 7/04* (2006.01)

(52) U.S. Cl.
USPC ......................................... 361/807; 361/727

(58) Field of Classification Search
USPC .......... 361/679.38, 679.39, 679.41, 686, 725, 361/727; 439/159, 160, 377, 945–947
See application file for complete search history.

(56) References Cited

U.S. PATENT DOCUMENTS

| | | | |
|---|---|---|---|
| 5,655,917 A * | 8/1997 | Kaneshige et al. | 439/155 |
| 6,035,216 A * | 3/2000 | Cheng et al. | 455/558 |
| 7,865,210 B2 * | 1/2011 | Wang et al. | 455/550.1 |
| 8,462,514 B2 * | 6/2013 | Myers et al. | 361/754 |

* cited by examiner

*Primary Examiner* — Hung S Bui
(74) *Attorney, Agent, or Firm* — Novak Druce Connolly Bove + Quigg LLP

(57) ABSTRACT

A portable electronic device includes a housing defining a mounting slot; and a chip card holding mechanism assembled within the housing for holding a chip card. The chip card holding mechanism includes a receiving tray slidably mounted on the housing, and an unlocking assembly for unlocking and ejecting the receiving tray. The receiving tray includes a tray body and a draw-off portion formed at one end of the tray body. The draw-off portion has an inclined resisting surface towards the tray body. The unlocking assembly is mounted in the housing and capable of resisting the inclined resisting surface to drive the receiving tray to move relative to the housing, and thereby eject the receiving tray.

15 Claims, 6 Drawing Sheets

US 8,902,609 B2

CHIP CARD HOLDING MECHANISM AND ELECTRONIC DEVICE USING THE SAME

CROSS-REFERENCE TO RELATED APPLICATIONS

This application is related to a co-pending U.S. patent application, which is: application Ser. No. 13/303,377, filed on Nov. 23, 2011, and entitled "CHIP CARD HOLDING MECHANISM AND PORTABLE ELECTRONIC DEVICE". In the co-pending application, the inventors are JU-PING DUAN; MING-FU LUO; and FA-GUANG SHI. The co-pending application has the same assignee as the present application. The disclosure of the above identified application is incorporated herein by reference.

BACKGROUND

1. Technical Field

The present disclosure relates to holding mechanisms, and particularly, to a chip card holding mechanism and an electronic device using the same.

2. Description of Related Art

Portable electronic devices such as mobile phones and tablet computers may employ at least one chip card (e.g., SIM card) for storing information, connecting to the internet, dialing calls, and the like. It is necessary to provide a chip card holding mechanism for holding/securing the chip card within the portable electronic device. The chip card holding mechanism may define a receiving space, an elastic sheet fitted in the receiving space, and a holding member rotatably assembled on the housing of the portable electronic device. The chip card can be received and held in the receiving space by the holding member, with the chip card resisting the elastic sheet. When detaching or replacing the chip card, a user must detach the outer cover from the portable electronic device first, thereby exposing the chip card holding mechanism, thus, removal and replacement of the chip card is inconvenient. In addition, known chip card holding mechanisms have complex structures, and the chip card holding mechanisms may not unlock if the pressure of the push by the user is not sufficient to rotate the holding member. On the other hand, excess pressure may cause damage to the holding mechanism.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the buffer mechanism. Moreover, in the drawings, like reference numerals designate corresponding parts throughout the several views. Wherever possible, the same reference numerals are used throughout the drawings to refer to the same or like elements of an embodiment.

DETAILED DESCRIPTION

Figure 1:
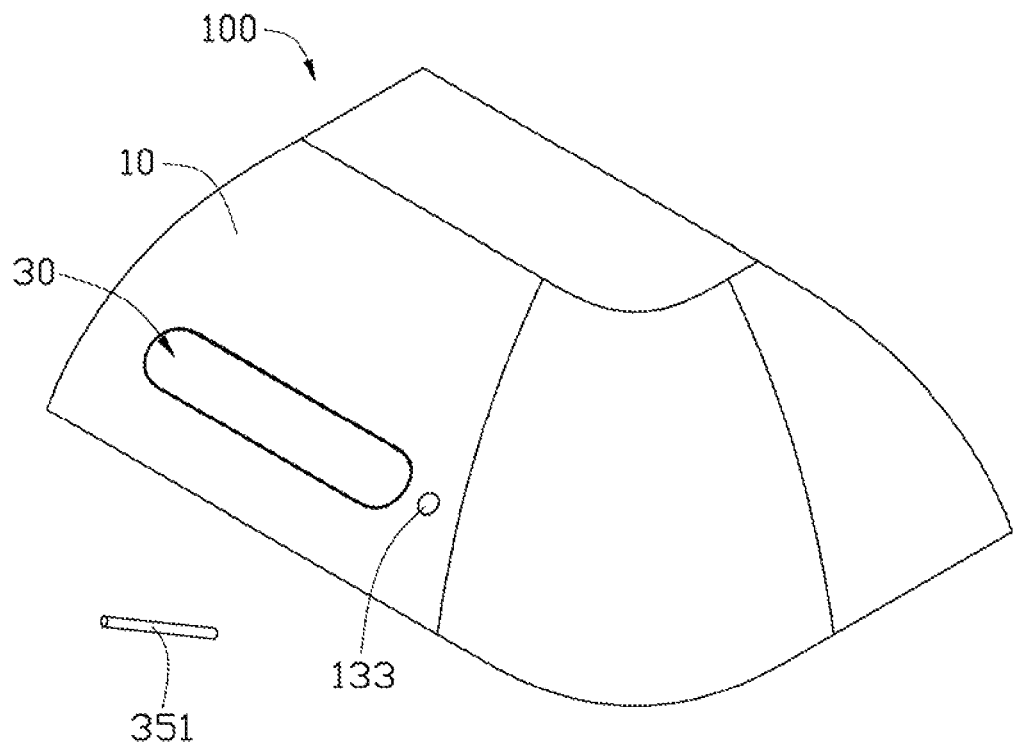
FIG. 1 is a partial, isometric view of an embodiment of an electronic device having a chip card holding mechanism.
Figure 2:
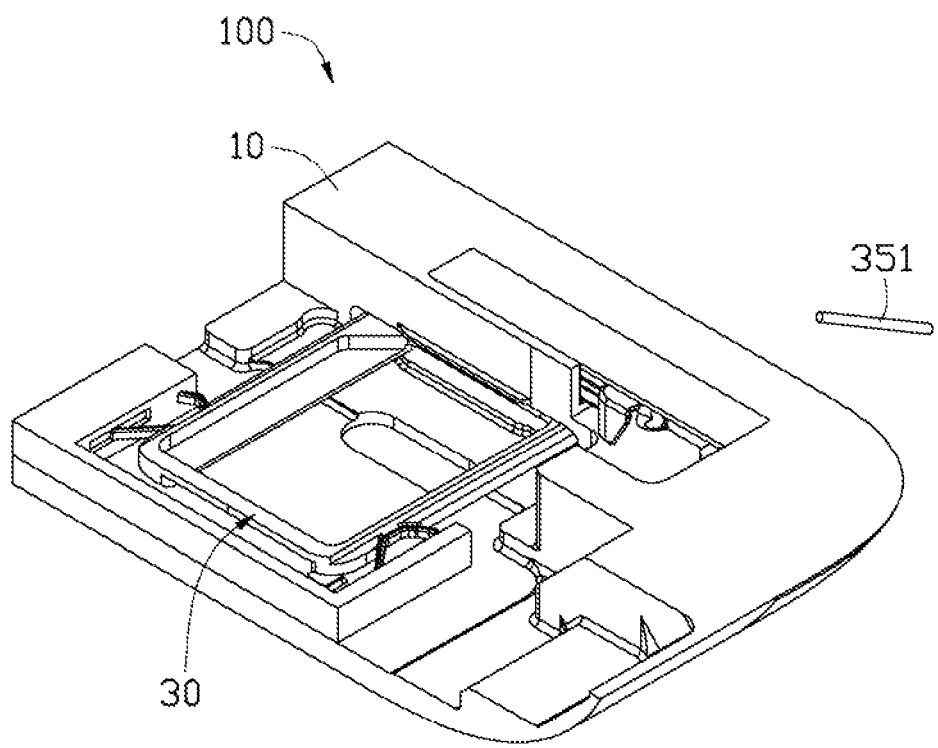
FIG. 2 is similar to FIG. 1, but viewed from another aspect.

Referring to FIGS. 1 and 2, an embodiment of a portable electronic device 100 includes a housing 10 (partially shown in the FIGS. 1 and 2), and a chip card holding mechanism 30 mounted in the housing 10 for holding a chip card (not shown). The portable electronic device 100 includes various modules for performing specific functions. However, for simplicity, only the modules related to the chip card holding mechanism 30 are described. The portable electronic device 100 may be a mobile phone, a tablet computer, or other electronic device. The chip card may be one of various types of cards such as an SD Card, a multimedia card (MMC Card), or a SIM Card. In the illustrated embodiment, the portable electronic device 100 is a tablet computer, and the chip card is a SIM card.

Figure 3:
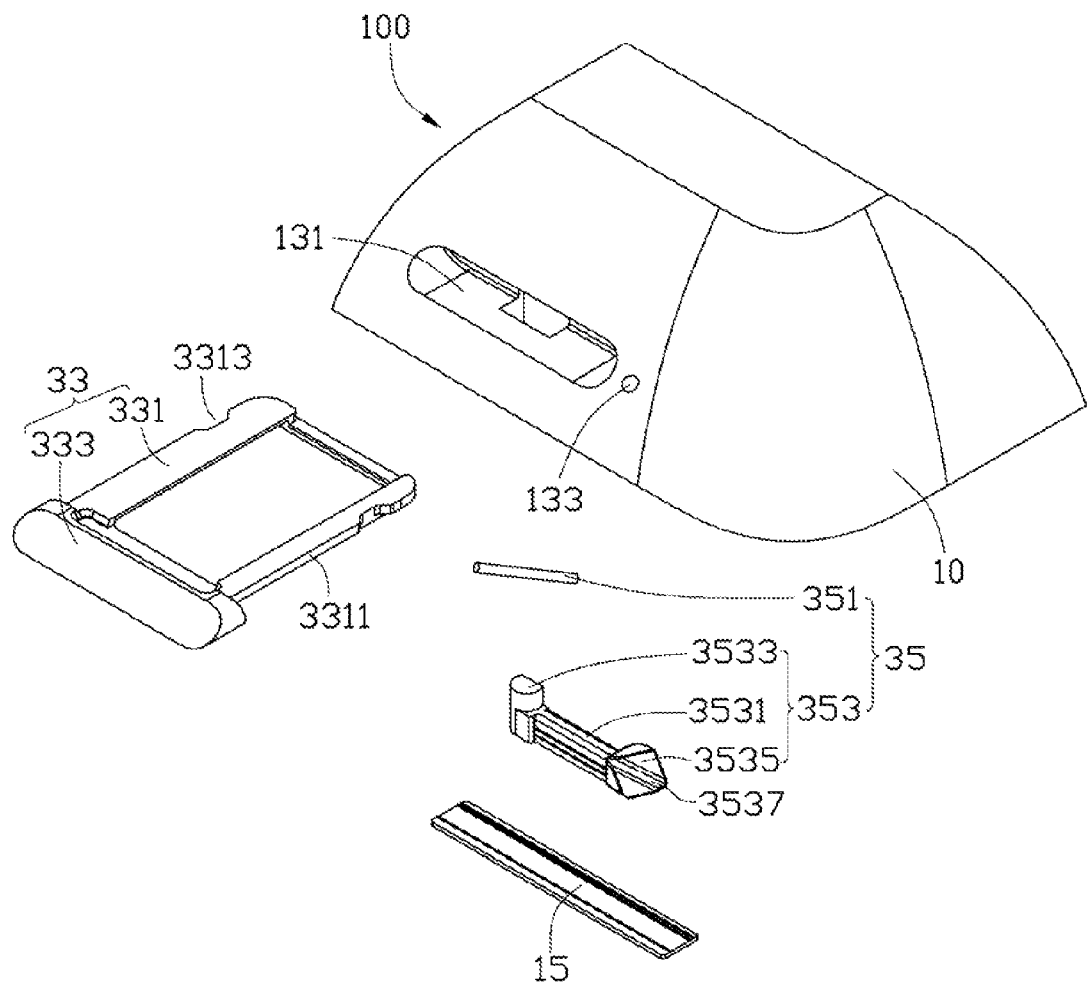
FIG. 3 is an exploded, isometric view of the electronic device shown in FIG. 1.
Figure 4:
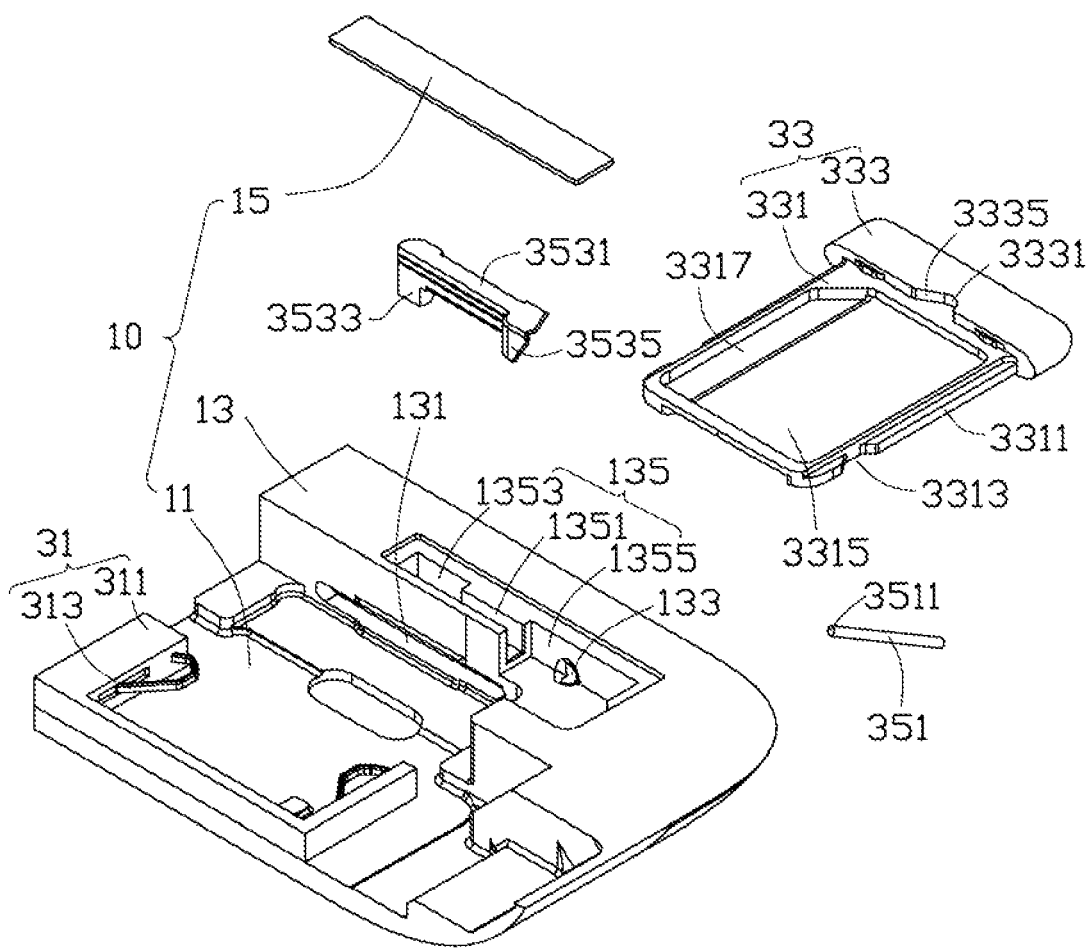
FIG. 4 is similar to FIG. 3, but viewed from another aspect.

Referring to FIG. 3 and FIG. 4, the housing 10 includes a support portion 11, a fixing portion 13 formed on one end of the support portion 11, and a cover sheet 15. The support portion 11 is substantially a flat plate, for supporting the chip card holding mechanism 30. The fixing portion 13 defines a mounting slot 131, an unlocking hole 133, and a receiving groove 135. The mounting slot 131 is substantially bar-shaped, and is defined through the fixing portion 13 and substantially parallel to the fixing portion 11, and communicates with the receiving groove 135. The unlocking hole 133 is defined through the fixing portion 13 and positioned adjacent to the mounting slot 131, and communicates with the receiving groove 135. The receiving groove 135 is defined at the side surface of the fixing portion 13 parallel to the support portion 11, and is perpendicular to the support portion 11 and communicates with the mounting slot 131 and the unlocking hole 133. The receiving groove 135 is substantially a long groove. The receiving groove 135 includes a middle portion 1351, and a first end 1353 and a second end 1355 at the two opposite ends of the middle portion 1351. The first end 1353 and the second end 1355 of the receiving groove 135 are larger than the middle portion 1351. The first end 1353 communicates with the mounting slot 131, and the second end 1355 communicates with the unlocking hole 133. The cover sheet 15 is a substantially flat sheet, and is mounted on the fixing portion 13 at the side surface parallel to the support portion 11, to cover the receiving groove 135.

The chip card holding mechanism 30 is slidably assembled in the housing 10, and includes a latching assembly 31, a receiving tray 33, and an unlocking assembly 35. The latching assembly includes a fixing member 311 and a pair of elastic members 313 mounted on the fixing member 311. The fixing member 311 is substantially rectangular, and is fixed on the support portion 11 at the end away from the fixing portion 13, with the opening thereof towards the fixing portion 13. The pair of elastic members 313 are symmetrically mounted on the two opposite inner sidewalls of the fixing member 311. Each of the pair of elastic members 313 is an elastic strip, and the two ends thereof are fixed on the corresponding inner sidewall of the fixing member 311. In the illustrated embodiments, the pair of elastic members 313 are elastic strips which are square in section.

The receiving tray 33 is detachably assembled in the housing 10 via the unlocking assembly 35. The receiving tray 33 includes a tray body 331 and a draw-off portion 333 formed at one end of the tray body 331. The tray body 331 is substantially rectangular, and forms a pair of latching portions 3311 at opposite sides. The tray body 331 defines a substantially rectangular accommodating groove 3315 in a top surface thereof, for receiving the chip card. The pair of latching portions 3311 define two latching grooves 3313 recessed from two opposite sides of the tray body 331 corresponding to the pair of elastic members 313. The tray body 331 forms a positioning portion 3317 at a side of the accommodating groove 3315 for positioning the chip card. The draw-off portion 333 is bar-shaped and has dimensions substantially the same as those of the mounting slot 131 of the housing 10. The draw-off portion 333 defines a groove 3331 facing the accommodating groove 3315 of the tray body 331. The groove 3331 includes an inclined resisting surface 3335 at the sidewall. The receiving tray 33 is inserted from the mounting slot 131, and the tray body 331 is supported by the support portion 11, and the draw-off portion 333 is received within the mounting slot 131 of the fixing portion 13.

The unlocking assembly 35 is mounted on the fixing portion 13 and positioned adjacent to the mounting slot 131, for unlocking and ejecting the receiving tray 33 out from the housing 10. The unlocking assembly 35 includes a driving member 351 and a resisting member 353. The driving member 351 is substantially a cylindrical rod, and has a diameter substantially the same as that of the unlocking hole 133 of the housing 10. The resisting member 353 is mounted on the tray body 331, and is received in the receiving groove 135. The resisting member 353 includes a base body 3531, a first resisting portion 3533 and a second resisting portion 3535 protruding from the opposite ends of the base body 3531. The base body 3531 is substantially rod-shaped, and is received in the middle portion 1351 of the receiving groove 135. The first resisting portion 3533 is substantially an arcuate protrusion, and is received in the first end 1353 of the receiving groove 135, and resists on the inclined resisting surface 3335. The second resisting portion 3535 is substantially a wedge shape, and is received in the second end 1355, and aligns with the unlocking hole 133. The second resisting portion 3535 defines a sliding groove 3537 at the surface towards the unlocking hole 133. The sliding groove 3537 inclines from the end near the first resisting portion 3533 to the end away from the first resisting portion 3533, and the end near the first resisting portion 3533 aligns with the unlocking hole 133. The driving member 351 has a resisting end 3511, and is inserted into the unlocking hole 113 to make the resisting end 3511 resist and slide along the sliding groove 3537, thereby making the resisting member 353 slide along the receiving groove 135, and thus making the first resisting portion 3533 resist the inclined resisting surface 3335.

In assembly, the fixing member 311 is mounted on the support portion 11, with the opening thereof towards the fixing portion 13. The pair of elastic members 313 are symmetrically mounted on the two opposite inner sidewalls of the fixing member 311. The receiving tray 33 is inserted from the mounting slot 131, and the pair of elastic members 313 latch with the two latching grooves 3313. The resisting member 353 is mounted on the tray body 331, and is received in the receiving groove 135. The cover sheet 15 is mounted on the fixing portion 13, and covers the receiving groove 135.

Figure 5:
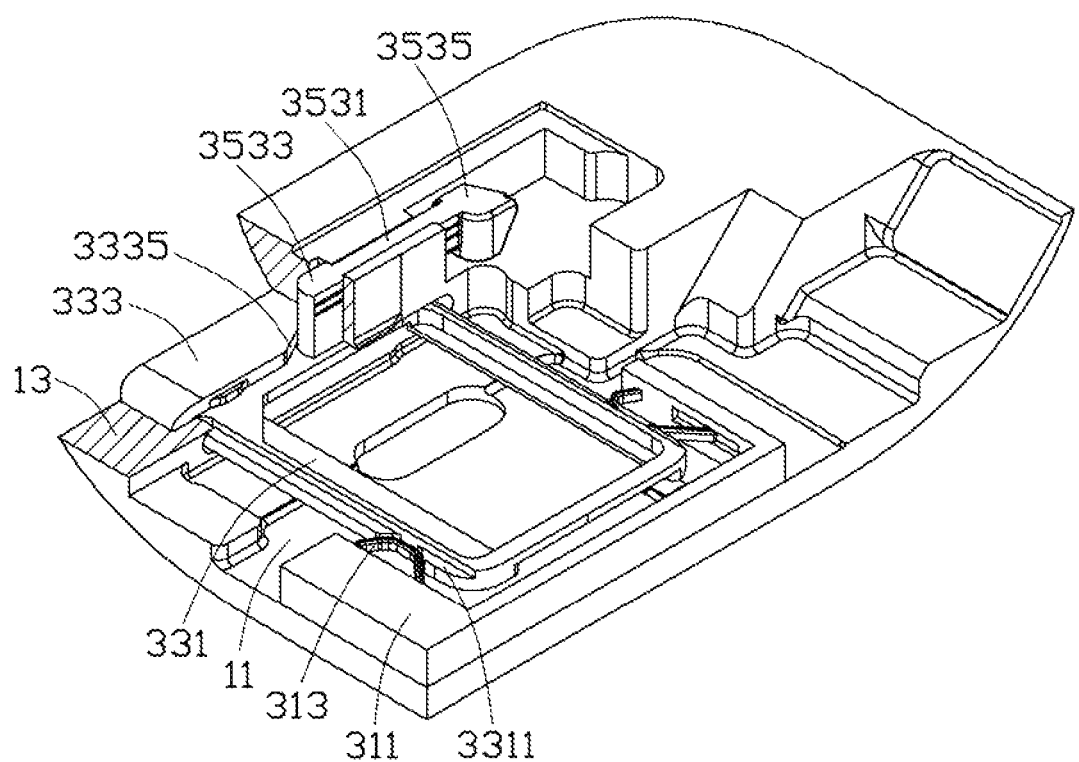
FIG. 5 is a partial, isometric, cutaway view of the portable electronic device of FIG. 2.
Figure 6:
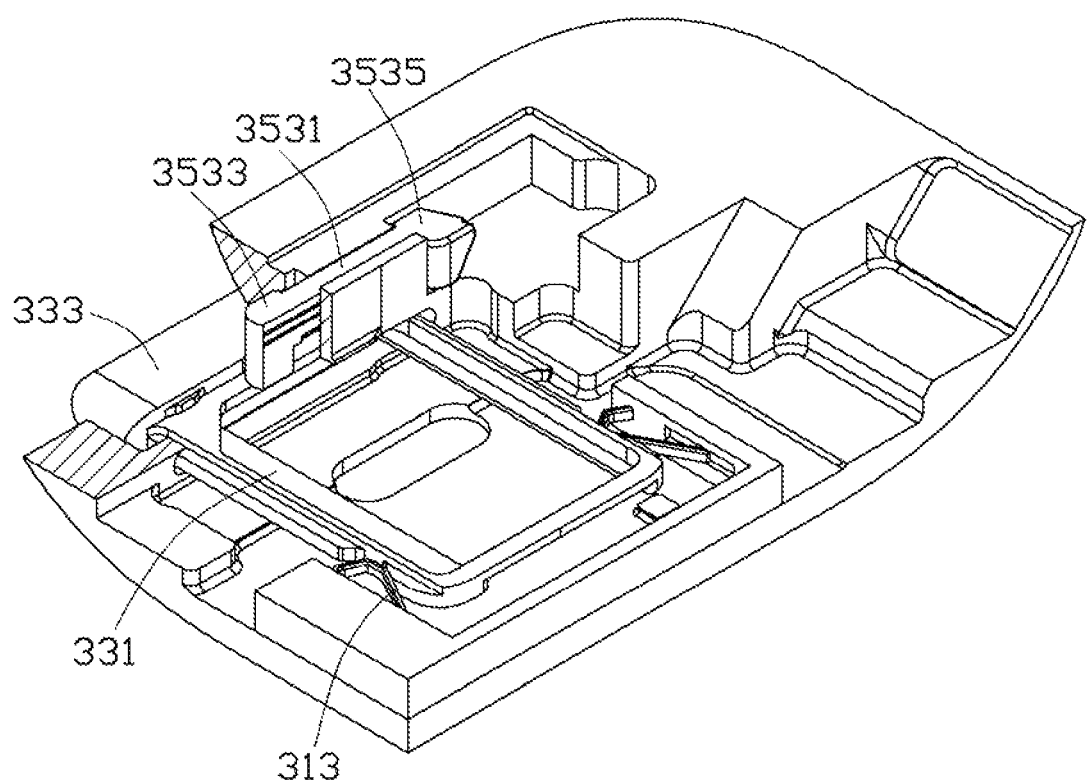
FIG. 6 is similar to FIG. 5, but showing the portable electronic device in another state.

Referring to FIGS. 5 and 6, when unlocking and ejecting the receiving tray 33, the resisting end 3511 of the driving member 351, is inserted into the unlocking hole 133 of the housing 10, and engaged into the sliding groove 3537. Since the sliding groove 3537 is disposed on an inclined surface of the second resisting portion 3535, a pushing force applied to the driving member 351 along a direction substantially perpendicular to the base body 3531 has a particular result. The wedge-shaped second resisting portion 3535 is pushed to slide toward the first resisting portion 3533, together with the base body 3531 and the first resisting portion 3533, along the receiving groove 135. Meanwhile, the arcuate surface of the first resisting portion 3533 slidably resists against the inclined resisting surface 3335, thereby pushing and ejecting the receiving tray 33 from the housing 10 via the mounting slot 131 of the housing 10. The draw-off portion 333 is exposed from the mounting slot 131, and the pair of elastic members 313 disengage from the two latching grooves 3313, thus, the receiving tray 33 can slide out from the mounting slot 131. Inserting a chip card into the receiving tray 33 and removing the chip card becomes very easy. The receiving tray 33 can be manually pushed to slide into the housing 10, and the pair of elastic members 313 latch with the two latching grooves 3313 to hold the receiving tray 33.

The groove 3331 can be omitted, and the inclined resisting surface 3335 can be formed at a protrusion extending from the draw-off portion 333 towards the tray body 331. The driving member 351 can be any other shape so long as it is rod-like at the end, such as a cylinder having a rod-shaped end, for clamping conveniently. The receiving tray 33 can be retained in the support portion 11 in other ways, such as by magnetism.

The chip card holding mechanism 30 has a simple structure, and is easy to operate. The receiving tray 33 is detachably assembled within the housing 10 via the driving member 351 for receiving the chip card. When the resisting member 353 is driven to resist against and push the inclined resisting surface 3335, the chip card together with the receiving tray 33 can be easily ejected. The pair of elastic members 313 latch and disengage with the latching grooves, to retain and release the receiving tray 33 relative to the fixing member 311. The chip card holding mechanism 30 uses a space very little larger than the size of the chip card itself, thus saving space in the portable electronic device 100.

It is believed that the present embodiments and their advantages will be understood from the foregoing description, and it will be apparent that various changes may be made thereto without departing from the spirit and scope of the embodiments or sacrificing all of its material advantages.

What is claimed is:
1. A portable electronic device, comprising:
a housing defining a mounting slot; and
a chip card holding mechanism assembled within the housing for holding a chip card, the chip card holding mechanism comprising:
a receiving tray slidably mounted on the housing and comprising a tray body and an draw-off portion formed at one end of the tray body, and
an unlocking assembly for unlocking and ejecting the receiving tray;
wherein the draw-off portion comprising an inclined resisting surface towards the tray body; the unlocking assembly is mounted in the housing and configured to resist the inclined resisting surface to drive the receiving tray to move relative to the housing, and thereby ejecting the receiving tray.

2. The portable electronic device of claim 1, wherein the housing further defines an unlocking hole adjacent to the mounting slot; the unlocking assembly comprises a resisting member and a driving member; the resisting member is mounted on the housing and positioned adjacent to the mounting slot; the driving member is adapted to be inserted into the unlocking hole for driving the resisting member to resist against the inclined resisting surface thereby ejecting the receiving tray.

3. The portable electronic device of claim 2, wherein the resisting member comprises a base body, a first resisting portion and a second resisting portion protruding from opposite ends of the base body; the first resisting portion is configured to resist against the inclined resisting surface via driving by the driving member.

4. The portable electronic device of claim 3, wherein the second resisting portion defines a sliding groove at a surface towards the unlocking hole; the sliding groove inclines from an end near the first resisting portion to an end away from the first resisting portion, and the end near the first resisting portion aligns with the unlocking hole.

5. The portable electronic device of claim 3, wherein the draw-off portion defines a groove, the inclined resisting surface defines a sidewall of the groove; the first resisting portion is received in the groove.

6. The portable electronic device of claim 2, wherein the housing comprises a support portion and a fixing portion formed on one end of the support portion; the mounting slot is defined through the fixing portion substantially parallel to the fixing portion; the unlocking hole is defined through the fixing portion and positioned adjacent to the mounting slot; the fixing portion defines a receiving groove at a side surface parallel to the support portion, and the receiving groove communicates with the mounting slot and the unlocking hole.

7. The portable electronic device of claim 6, wherein the receiving groove comprises a middle portion, a first end and a second end at two opposite ends of the middle portion; the first end communicates with the mounting slot, and the second end communicates with the unlocking hole.

8. The portable electronic device of claim 6, wherein the housing further comprises a cover sheet; the cover sheet is mounted on the fixing portion, and covers the receiving groove.

9. The portable electronic device of claim 6, wherein the chip card holding mechanism further comprises a latching assembly; the latching assembly comprises a fixing member and a pair of elastic members mounted on opposite inner sidewalls of the fixing member; the fixing member is mounted on the support portion; the tray body of the receiving tray defines a pair of latching grooves at opposite sides; the pair of elastic members latch with the pair of latching grooves.

10. A chip card holding mechanism for holding a chip card, the chip card holding mechanism comprising:

a receiving tray slidably comprising a tray body and an draw-off portion formed at one end of the tray body, and an unlocking assembly for unlocking and ejecting the receiving tray;

wherein the draw-off portion comprising an inclined resisting surface towards the tray body;

the unlocking assembly is mounted on the receiving tray and configured to resist the inclined resisting surface to drive the receiving tray to move thereby ejecting the receiving tray.

11. The chip card holding mechanism of claim 10, wherein the unlocking assembly comprises a resisting member and a driving member; the driving member is configured to drive the resisting member to resist against the inclined resisting surface thereby ejecting the receiving tray.

12. The chip card holding mechanism of claim 10, wherein the resisting member comprises a base body, a first resisting portion and a second resisting portion protruding from opposite ends of the base body; the first resisting portion is configured to resist against the inclined resisting surface via driving by the driving member.

13. The chip card holding mechanism of claim 12, wherein the second resisting portion defines a sliding groove at a surface; the sliding groove inclines from an end near the first resisting portion to an end away from the first resisting portion.

14. The chip card holding mechanism of claim 12, wherein the draw-off portion defines a groove, the inclined resisting surface defines a sidewall of the groove; the first resisting portion is received in the groove.

15. The chip card holding mechanism of claim 10, wherein the chip card holding mechanism further comprises a latching assembly; the latching assembly comprises a fixing member and a pair of elastic members mounted on opposite inner sidewalls of the fixing member; the tray body of the receiving tray defines a pair of latching grooves at opposite sides; the pair of elastic members latch with the pair of latching grooves.

* * * * *